(No Model.)
F. L. MOORES.
LIME SLACKER.
No. 520,328. Patented May 22, 1894.
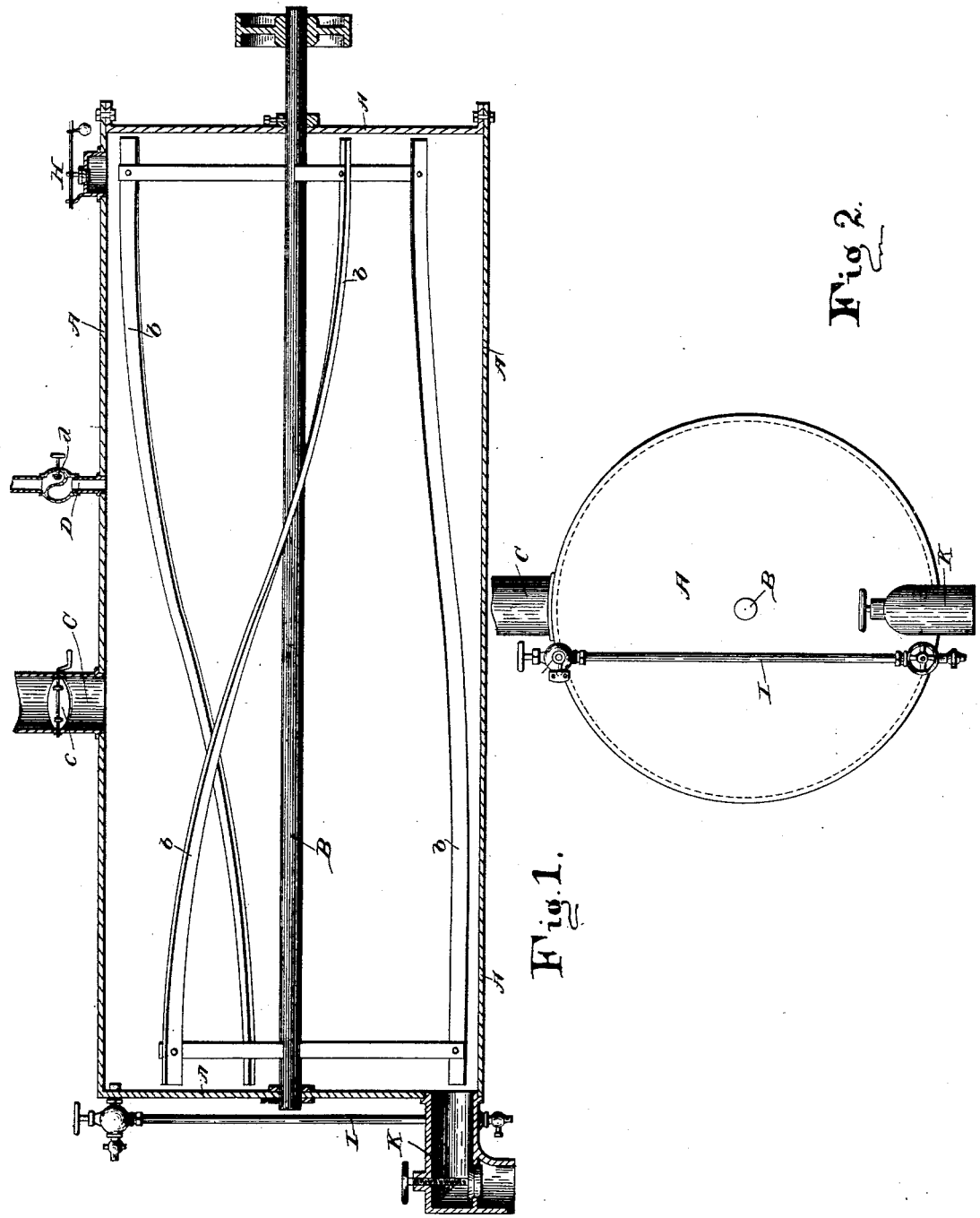
Witnesses:
Theo. L. Gatchel
Edwin L. Bradford
Inventor:
Fenton Lawson Moores.
by V. D. Stockbridge & Son.
Attorneys

UNITED STATES PATENT OFFICE.

FENTON LAWSON MOORES, OF CINCINNATI, OHIO.

LIME-SLAKER.

SPECIFICATION forming part of Letters Patent No. 520,328, dated May 22, 1894.

Application filed July 22, 1893. Serial No. 481,218. (No model.)

*To all whom it may concern:*

Be it known that I, FENTON LAWSON MOORES, a citizen of the United States, residing in the city of Cincinnati, Hamilton county, Ohio, have invented certain new and useful Improvements in Lime-Slakers; and I do hereby declare that the following is a full, clear, and exact description of the invention, such as will enable others skilled in the art to which it appertains to make and use the same.

My invention relates to improvements in lime slakers.

The object of the invention is to provide means for slaking lime in the most efficient and expeditious manner, and to this end, the invention consists of the combination of a closed cylindrical vessel, an agitator mounted to operate within the vessel, a valved discharge port and a valved conduit for the introduction of lime, a separate valved conduit for the introduction of water and a vent to relieve the vessel.

The invention also consists in other combinations hereinafter described and claimed.

In the drawings forming a part of this specification, Figure 1 is a section of a lime-slaking vessel and connections showing my invention. Fig. 2 is an end elevation of the same.

A is a cylindrical vessel made with one or both of its heads removable for the convenient introduction of the agitator or means for stirring and mixing the water and lime. In the form shown, the agitator or mixer consists of a shaft B driven by any suitable gearing with any suitable motor and spirally-arranged blades $b$.

C is a lime conduit leading from a suitable hopper or meter to the vessel. This conduit consists of a pipe about six inches in diameter more or less tightly fitted to the vessel, and said pipe is provided with a valve or cut-off $c$ to cut off the flow of lime into the vessel and to close said vessel and prevent the escape of steam or vapors during the slaking process.

D is a water conduit or pipe closely fitted to the shell of the vessel leading from suitable water-supply. This pipe is provided with cock $d$ to cut off the water at will.

H is a safety-valve to provide a vent during the introduction of water and lime and to relieve the vessel in case the internal pressure becomes too great during the slaking process.

I is a gage similar to the well-known water-gage to indicate the volume of the contents to the operator, and K is a cock or faucet for drawing off or discharging the contents from the vessel. For the perfect or complete discharge of the contents the vessel may be arranged in an inclined position, if desired.

In the use of this slaker, it is proposed to use lime previously pulverized or commingled so that there are no lumps or core mixed with the paste. Water is introduced to the vessel through pipe D, and the desired amount indicated by means of water-gage I when it is shut off; then lime to the required amount is introduced through conduit C, the amount being indicated by the gage when the valve or cut-off $c$ is closed. The safety-valve, open during the introduction of water and lime, is now closed and the mixer which has been in operation continues its work until the lime has become thoroughly slaked when the lime-paste is drawn off through cock K and the operation repeated.

Obviously, the lime and water may be measured and proportioned before or as they are introduced to the slaker, in which case the gage I may be dispensed with, but I regard the use of the gage as a simple and efficient device for enabling the operator to correctly proportion the lime and water.

By this apparatus, I am enabled to slake lime more expeditiously and secure a better product and a more constant quality of product than by any other means known to me.

Having now described my invention, what I claim is—

1. In a lime slaker, the combination of a tightly closed vessel, an agitator or mixer within the vessel, a separate valved conduit for the introduction of lime, a separate valved conduit for the introduction of water, and means to vent and relieve the vessel, substantially as described.

2. In a lime slaker, the combination of a closed vessel, an agitator or mixer within the vessel, means for the introduction of water and lime to said vessel, a gage and a safety valve, substantially as described.

In testimony whereof I affix my signature in the presence of two witnesses.

FENTON LAWSON MOORES.

Witnesses:
CHAS. S. BAILEY,
H. W. BEARS.